United States Patent [19]

DeLong et al.

[11] 3,864,521

[45] Feb. 4, 1975

[54] FREQUENCY DIVISION MULTIPLEX TELEPHONE SYSTEM

[75] Inventors: Vincent R. DeLong, Marion; Merrill T. Ludvigson, Cedar Rapids; Frank M. Apple; John L. Leeson, both of Marion; Edwin G. Houghton, Cedar Rapids, all of Iowa

[73] Assignee: Rockwell International Corporation, Dallas, Tex.

[22] Filed: Oct. 25, 1973

[21] Appl. No.: 409,527

[52] U.S. Cl. .......................... 179/2.5 R, 179/15 FD

[51] Int. Cl. .............................................. H04j 1/06

[58] Field of Search ........ 179/2.5 R, 15 AL, 15 BY, 179/18 J, 15 FD

[56] References Cited

UNITED STATES PATENTS

| | | | |
|---|---|---|---|
| 2,927,966 | 3/1960 | Weller | 179/2.5 R |
| 3,045,066 | 7/1962 | Beuscher | 179/2.5 R |
| 3,597,549 | 8/1971 | Farmer | 179/15 AL |
| 3,757,053 | 9/1973 | Pell et al. | 179/15 BY |
| 3,781,478 | 12/1973 | Blahut et al. | 179/15 AL |
| 3,809,815 | 5/1974 | Reed et al. | 179/15 FD |

*Primary Examiner*—Kathleen H. Claffy
*Assistant Examiner*—Tommy P. Chin
*Attorney, Agent, or Firm*—Howard R. Greenberg

[57] ABSTRACT

A telephone system serves a plurality of telephone stations by a common cable over which different carrier frequency telephone channels are provided for individual audio communication paths between subscribers and wherein a control center automatically monitors and allocates the utilization of all telephone channels.

27 Claims, 7 Drawing Figures

FREQUENCY DIVISION MULTIPLEX TELEPHONE SYSTEM

BACKGROUND OF THE INVENTION

The invention disclosed herein pertains to telephone systems generally and in particular to a telephone system which utilizes frequency division multiplexing for providing individual audio communication paths via different frequency telephone channels on a common cable between telephone subscribers on an automatic switching basis.

With the legal principle permitting telephone users to own rather than lease their telephone equipment now firmly established, the substantial savings in outright ownership over rental of telephone equipment has greatly stimulated the sales of private telephone systems. This is particularly true in the area of private automatic branch exchanges which provide special features and automatic switching capability for effectuating individual audio communication paths between the telephone stations which comprise the branch exchange while permitting communication with the outside world (telephone stations in other exchanges) through trunk lines which are usually rented from the telephone operating companies. A multistation telephone user such as a company or motel may purchase as large an exchange as necessary for handling the internal telephone traffic among the exchange stations and rent as many trunk lines as is required for handling telephone traffic to and from the outside world. These exchanges are for the most part space-divided telephone systems wherein each telephone station is connected to a central switching system by its own telephone wires and an audio communication path is provided between telephone stations by establishing an individual metallic path between the associated station telephone lines through the central switching equipment. The cost of this system must cover not only the central switching equipment which is complex and expensive, but also each and every telephone line comprising the telephone distribution system required for each and every telephone station. If prewiring is used to initially make available telephone lines for future use then its capitalization is wasted until in fact used when the demand for it develops. If prewiring is not provided, then as the telephone system is expanded to accommodate new telephone stations new telephone lines must be physically added to the distribution plant which can prove to be a costly undertaking. Also if a telephone subscriber changes his telephone station and wishes to retain his same telephone number, the central switching equipment must be rearranged, the difficulty of which depends upon the type of system used. It can thus be readily appreciated that in large systems serving a large number of telephone stations, the investment in central switching equipment as well as the telephone lines connecting the stations to the central switching equipment and the equipment associated therewith (e.g. distribution frames) can be sizable and pose difficult and expensive problems to private owners in expanding or modifying the telephone station arrangement whether or not provided for at the outset.

One way to overcome the problems presented in a space-divided telephone system is to employ frequency division multiplexing wherein individual audio communication paths are provided between telephone stations on a common cable by means of different frequency carrier signals which are modulated by the audio signals to be transmitted. Each carrier signal having a unique frequency different from all the others provides an individual channel on the cable over which audio signals can be transmitted. This system is especially attractive when there is already a cable available for telephone use, as for example, a closed circuit TV cable now being used by some companies and motels. To establish a telephone station to serve a subscriber it is only necessary to connect the telephone station apparatus to the cable at an accessible point. This substantially reduces the cost of the telephone distribution system. Although the suggested type of system is not unknown in the prior art its general application to telephone systems has been limited by the difficulty of providing automatic switching capability for setting the telephone stations requiring an audio communication path therebetween to the same telephone channel. In all prior art systems the means for establishing a path between a calling and called telephone station is the calling subscriber himself who normally sets his own telephone instrument to the channel dedicated to the called station, a system which leaves a great deal to be desired, particularly when the telephone system is large (e.g. each station requires a dedicated channel).

Another deficiency in space-divided telephone systems, particularly relevant to large multistation users, lies in the limited conferencing capability available for interconnecting more than two telephone stations on a single call. As each additional station is connected to a conference call its input impedance (including its connected line impedance) creates additional line impedance unbalance which degrades the quality of audio transmission. Thus, dependant on the telephone system design, space-divided systems have some limit as to the number of stations which can be conferenced while maintaining an acceptable quality of service. With the foregoing in mind, it is a primary object of the present invention to provide a new and improved telephone system which employs frequency division multiplexing for providing on a common cable a plurality of audio communication channels to serve a plurality of telephone stations and which includes automatic switching capability for connecting the stations to the telephone channels.

It is a further object of the present invention to provide such a new and improved frequency division multiplex telephone system wherein the signals indicative of station conditions necessary for establishing the various audio communication paths between calling and called stations and the control signals necessary for assigning the individual telephone channels are transmitted over the same common cable used for transmitting the audio signals.

It is still a futher object of the present invention to provide a frequency division multiplex telephone system having virtually unlimited conferencing capability.

Further objects of the present invention will become readily apparent from the detailed description of the invention which follows hereinafter when considered together with the appended drawings.

BRIEF DESCRIPTION OF THE INVENTION

In accordance with the frequency division multiplex telephone system of the invention, each telephone station includes equipment for transmitting and receiving modulated carrier signals over a common cable, the carrier frequencies of which are determined by channel control signals applied thereto, each channel control signal being associated with a different pair of transmitting and receiving carrier frequencies which define a single telephone channel. There are as many telephone channels as different carrier frequency pairs. Telephone stations seeking an audio communication path therebetween are set to the same telephone channel by the same channel control signal being applied thereto. The channel control signals are generated and applied to the telephone stations by a control center which allocates and monitors the utilization of all telephone channels in response to monitor signals received from the telephone stations indicating various station conditions, such as off-hook information and the identities of called stations. The communication system for exchanging control and monitor signals between the control center and individual telephone stations includes means for properly routing control signals to their intended destinations and for permitting the control center to recognize the station source for all monitor signals.

In the preferred embodiment the monitor and control signals are transmitted and received over the same common cable as the audio signals through two individual telephone channels, which are respectively dedicated for that purpose. The signals are time division multiplexed and coded so that their destinations for control purposes and sources for monitor purposes are determinable.

DETAILED DESCRIPTION OF THE INVENTION

Figure 1:
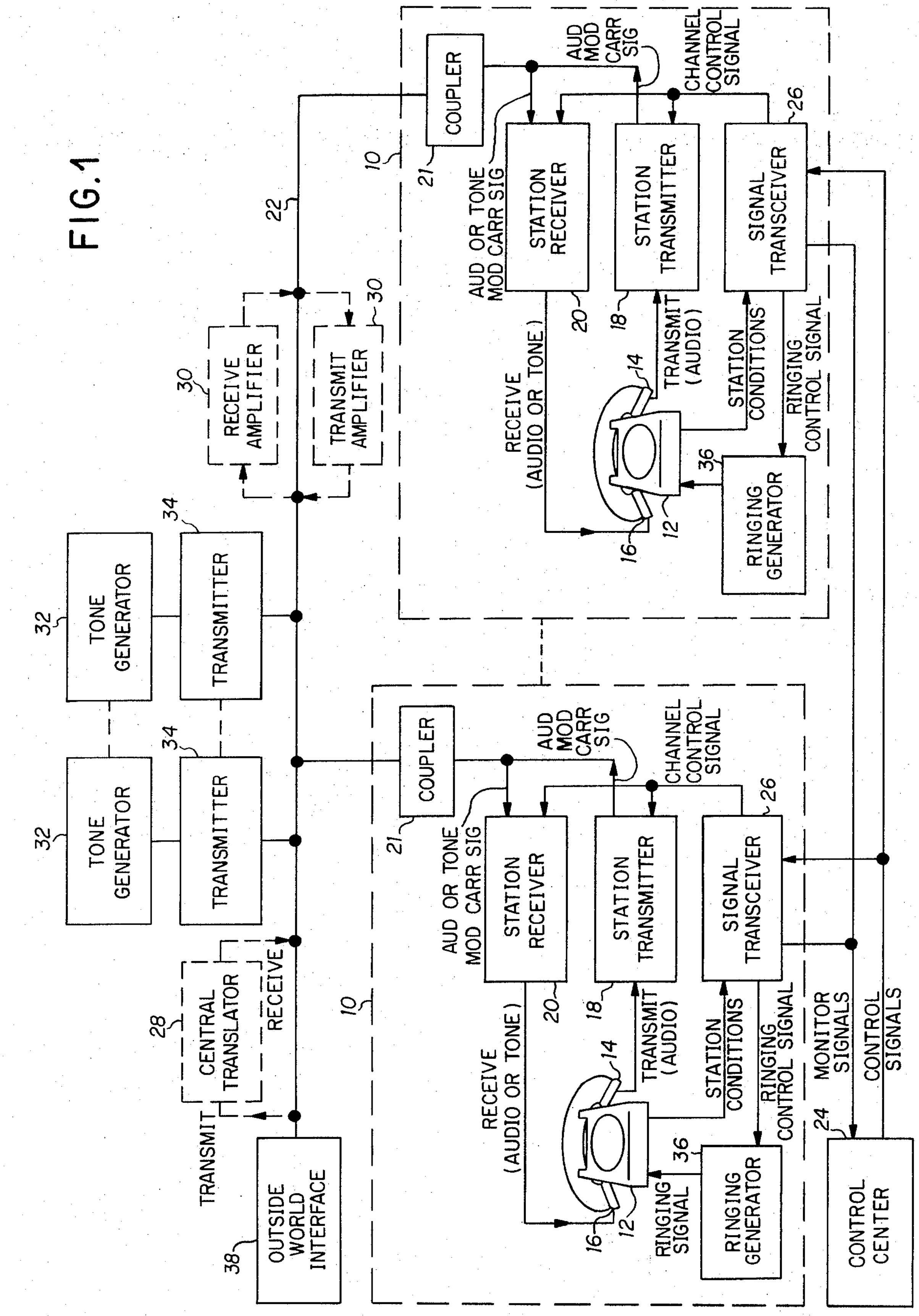
FIG. 1 is a block diagram of the frequency division multiplex telephone system of the invention.

As shown in FIG. 1 the frequency division multiplex telephone system of the invention is employed in conjunction with a plurality of telephone stations 10, each having a standard telephone instrument 12 which performs all of the normal telephone functions. The telephone transmitter 14 (for converting voice signals to electrical audio signals) and receiver 16 (for converting electrical signals to audible signals) of each telephone 12 are connected to a station transmitter 18 and station receiver 20 respectively, which are themselves connected via a coupler 21 to a common cable 22 shared by all of the telephone stations 10. The coupler 21 is a well known device which serves to match the electrical impedance of the station 10 to that of the cable 22 in order to minimize wave reflections and additionally may be used to impart directionally to electrical signals on the cable.

Audio signals generated in each of the telephone transmitters 14 are applied to its associated station transmitter 18 where they are mixed with a carrier signal to generate an audio modulated carrier signal which is applied to the common cable 22. The frequency of the carrier signal may be varied in accordance with a channel control signal applied to the transmitter 18. Each carrier signal has a unique frequency for providing an individual transmission channel over which audio signals can be transmitted on the common cable 22. There are as many different (frequency) carrier signals, each being associated with a different channel control signal, as the number of transmission channels desired, with the separation between adjacent frequencies being great enough to accommodate the normal three-four kilocycle audio bandwidth used in telephone systems. Each transmitter 18 is responsive to all of the channel control signals so that it can be set to any one of the transmission channels.

Each station receiver 20 can be set to detect a particular modulated carrier signal on the cable 22, with the extracted modulation information being applied to its connected telephone receiver 16. The carrier frequency to which the station receiver 20 is set for detection may be varied in accordance with the channel control signal applied thereto (being the same signal which is also applied to the associated transmitter 18), there being a different carrier frequency detected for each channel control signal. There are as many different (frequency) carrier signals which can be detected as the number of desired reception channels with each transmitter 20 being responsive to all of the channel control signals so that it can be set to any reception channel.

Each transmission channel has automatically associated therewith an individual reception channel, both being determined by a given channel control signal; in one system to be described hereinafter each associated transmission and reception channel has the same carrier frequency while in a different system also to be described, each transmission and reception channel of a pair has a carrier frequency related to one another by the same difference frequency (obtained by subtracting one frequency from the other). In either case, once a transmission channel is selected for a telephone station 10, its reception channel is automatically determined. Thus, each channel control signal is seen to provide a different pair of transmission and reception channels, while each channel pair provides an individual telephone channel on the cable 22 over which audio signals can be passed between telephone stations 10 to permit a telephone conversation therebetween. To establish a telephone channel between stations it is only necessary to apply the same channel control signal to their respective station transmitters 18 and receivers 20.

If a nonblocking system is desired (viz. a communication path is always available for interconnecting idle telephone stations) then there must be at least half as many telephone channels as there are telephone stations 10. In such a system each station 10 could be assigned a dedicated telephone channel so that in order to make a call, the calling station would merely be put on the same telephone channel as that dedicated to the called station by applying thereto the channel control signal associated with the called station telephone channel or in the alternative the called station could be set to the telephone channel dedicated to the calling station telephone channel. Because of the inordinate cost for providing nonblocking in large telephone systems and since in normal telephone traffic usage not all telephone stations will require telephone paths at the same time, some blocking is usually tolerable and financially expedient. Such a system is provided by the present invention by making available a fixed number of telephone channels which are not dedicated but are shared by all of the telephone stations 10, each station 10 being assigned a telephone channel for providing a telephone path to another station only during the period of the call. Once the call is completed and the conversation ended the telephone channel is released for subsequent use by any of the telephone stations 10.

The channel control signals, as well as all other types of control signals (e.g. to control ringing) are generated by a control center 24 which, in addition to other functions, monitors and allocates the utilization of telephone channels among the various telephone stations 10. All control signals are applied to the stations 10 through a plurality of signal transceivers 26, there being an individual one physically located at and associated with each of the stations 10. Each signal transceiver 26 includes circuitry for recognizing control signals intended for its associated station 10 so that it can permit these signals to pass therethrough while all other control signals are ignored.

To perform its necessary functions, the control center 24 requires certain station condition information such as whether or not a telephone instrument 12 is off-hook (telephone handset removed from its cradle so that the hook switch is disengaged) indicating the telephone in use and the identification of each called station to which a calling station subcriber wishes to be connected. The control center 24 must also be permitted to identify the telephone station 10 from which each piece of information originated so that it can properly act on this information. The off-hook station condition information permits the control center 24 to recognize a service request by a calling station as well as whether or not a called station is idle or busy (if busy the calling station under normal conditions is not provided a telephone path to the called station). The identification of each called station is of course necessary to enable the control center 24 to determine between which telephone stations 10 telephone channels are to be provided. The called station identity can be provided in the customary telephone manner through the use of station digits, there being a unique set of digits (station telephone number) for each telephone station 10. In this connection it should be noted that dial pulses provided by a rotary dial or multi-frequency tones provided by push buttons can be used dependent only upon which system is desired. The control center 24 must be capable of associating each set of called station digits with the station 10 generating those digits to determine which pair of stations require a telephone channel. Once the control center 24 receives the foregoing information it can assign a telephone channel by applying the associated channel control signal to the proper stations 10.

The control center 24 receives the information in the form of monitor signals generated in the signal transceivers 26 in response to various subscriber actions requiring processing. Each transceiver 26 includes circuitry for encoding the monitor signals so that the control center 24 is able to recognize the information as well as from which station each monitor signal originated. The type of coding used in the system control 24 and signal transceivers 26 of course depends on the particular communication scheme employed in passing control and monitor signals therebetween. There are numerous well known schemes for accomplishing this and one which uses the common cable 22 (in combination with frequency and time division multiplexing) for signal as well as audio communication will be described later. In this connection it should be pointed out that the control and monitor signal lines of FIG. 1 represent signal paths and not physical wires since it is apparent from the foregoing that the number of wires actually used will depend on the signal communication scheme chosen.

As already mentioned, the carrier signal frequency of the reception channel can be equal to or different from that of its associated transmission channel. In the case of the latter, a central translator 28 is required for receiving all of the transmitted modulated carrier signals on the common cable 22 and shifting their respective carrier frequencies by a fixed amount before reapplying the signals to the common cable. The translator 28 can include an ordinary mixer for performing this function. The use of dual-frequency telephone channels (associated transmission and reception channel frequencies different) rather than single-frequency telephone channels (associated transmission and reception channel frequencies the same) is a proven technique which overcomes a number of very practical communication problems. For example, signal amplification can be provided in a single frequency telephone channel system using a single cable both for transmission and reception only by employing a complex hybrid circuit in the cable which substantially contributes to the over all cost of the system and increases the possibility of operating problems. The use of a dual-frequency telephone channel system in the subject invention permits bandpass amplifiers 30 (amplifier combined with a bandpass filter) to be connected in parallel anywhere along the common cable 22 as shown in FIG. 1. The bandwidth of the transmit amplifier 30 is set for the transmission carrier frequencies (transmit signals coming from the right station) while the bandwidth of the receive amplifier 30 is set for the reception carrier frequencies (receive signals coming from the left station). It should be noted that both the single frequency and dual-frequency telephone channel systems can be used with either a two wire or four wire cable. In the latter case all the station transmitters 18 would be connected to one pair of wires constituting the transmission section while all the station receivers 20 would be connected to the other pair of wires constituting the reception section with the central translator 28 interconnecting the transmission and reception sections for the dual-frequency telephone channel system.

Telephone systems customarily provide various supervisory tones to the telephone receiver 16 at a calling station so that the calling subscriber is apprised of the status of his call. The tones are sufficently different so as to be readily recognizable by the subscriber through experience so that he knows through one tone (busy) if the called station is already engaged in a conversation, from another tone (ring-back) if the called station is being rung etc. These supervisory tones are handled in the subject telephone system by setting aside an individual transmission channel for each required supervisory tone, each tone being generated by a separate tone generator 32 which is connected through a transmitter 34 to the telephone cable 22 for applying thereto a continuous tone modulated carrier signal. Each transmission channel set aside for transmitting a tone signal has associated therewith a reception channel the same as each audio transmission channel. To enable a telephone station 10 to receive a supervisory tone, the control center 24 merely applies to its transceiver 26 the channel control signal associated with the transmission channel dedicated to that supervisory tone.

Ringing is accomplished in the subject telephone system by an individual ringing generator 36 located at each station 10 which generates and applies to the ringer in its associated telephone instrument 12 a ringing signal whenever a ringing control signal is applied thereto by the control center 24 via its associated signal transceiver 26. Communication with the outside world (telephones in all other exchanges) is provided by interface circuitry 38 which may include ordinary telephone trunks as well as other types of communication equipment such as radio transceivers if desired and any associated equipment necessary to convert the modulated carrier signals to a format compatible with the communication medium or media used.

As mentioned previously the control center 24 receives monitor signals from all of the telephone stations 10 indicative of various subscriber actions and responds in a predetermined manner with the appropriate control signals necessary to act on the information. Thus, each different monitor signal (indicating a different subscriber action) requires a different control signal responsive thereto, a system requirment which patently can be performed in a number of ways, for example with hard-wired logic circuitry or a stored computer program used in conjunction with a general purpose computer. The latter provides great flexibility for expanding the system and for offering all types of special telephone features, for example, conference calls. Since the telephone stations 10 do not have individual telephone lines associated therewith, unlike in the ordinary space-divided telephone system, special conference circuits are not required nor is there any problem with line impedance mismatches which adversely affect the quality of conference calls as the number of conferees on any one call increases and which would otherwise pose a practical limitation on the number of stations which can be conferenced. In the subject telephone system there is virtually no such limit; all there being required is that all the conferee stations be set to the same telephone channel by the control center 24 in response to a conference control signal (to be described in detail hereinafter). In this connection it should be pointed out that single sideband audio modulation which is a well known modulation techniques ideally suited for conferencing since it inherently avoids modulated signal cancellation effects which may occur when two or more conferees speak simultaneously. Furthermore single sideband modulation increases the number of channels which can be provided within a given bandwidth.

Having discussed the frequency division multiplex telephone system generally, we may now consider typical apparatus which ought to be included in each telephone station 10 and the control center 24 for implementing the system operation. Although, as already noted, the communication scheme for transmitting and receiving control and monitor signals may take any one of numerous forms, in the preferred embodiment to be described these signals are transmitted on a time division multiplex basis on the common cable 22 along with the audio signals, each group of signals being transmitted on an individual transmission channel (and received on the associated reception channel) dedicated thereto. Thus, each station 10 transmits monitor signals to the control center 24 on a fixed telephone channel shared by all the stations 10, and receives control signals from the control center 24 on a different fixed telephone channel also shared by all the stations 10.

Figure 2:
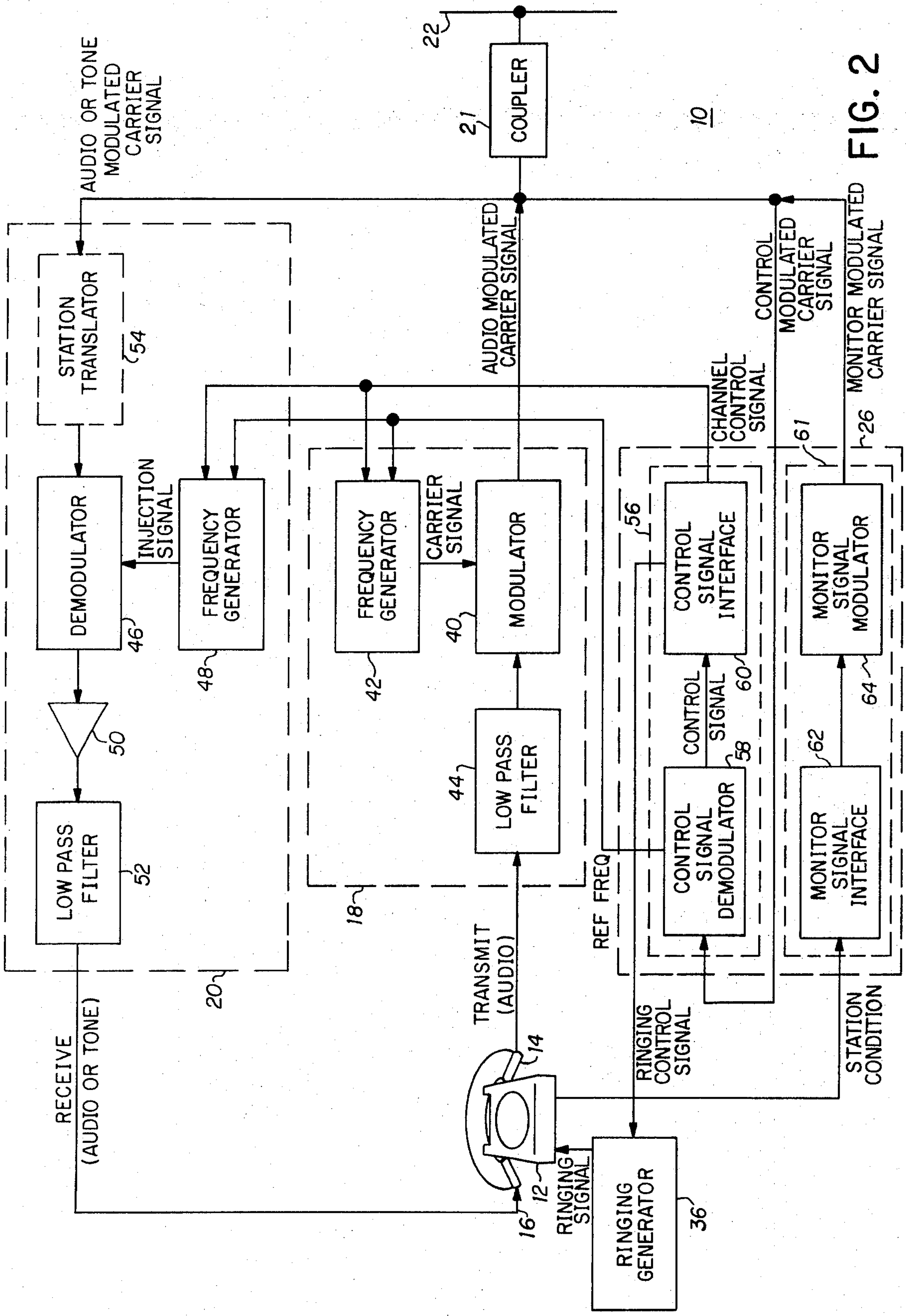
FIG. 2 is a detailed block diagram of the station telephone apparatus for implementing the invention in connection with the preferred embodiment.

Looking first to an individual telephone station 10 as depicted in FIG. 2, it is seen that the station transmitter 18 includes a modulator 40 for mixing the audio signal to be transmitted with a carrier signal generated and applied thereto by a variable frequency generator 42 to produce the audio modulated carrier signal which is then applied to the common cable 22 through the coupler 21. The audio signal for transmission is passed through a low pass filter 44 before applying it to the modulator 40 to filter out unnecessary high frequencies. The details of the modulator circuit 40 will of course depend upon the type of modulation used, it already being mentioned that single-sideband modulation is ideal for use herein. Since modulator circuits for performing all types of modulation including single-sideband are well known it is not necessary to present the modulator circuit 40 details.

The station receiver 20 is seen to include a demodulator 46 for extracting the modulation information (audio or tone) from a modulated carrier signal received over a particular reception channel whose frequency is determined by an injection signal generated and applied thereto by a variable frequency generator 48. Like the modulator 40 the actual details of the demodulator 46 will depend upon the modulation used as well as the demodulation technique for extracting the information. Since all types of demodulator circuits are well known there is no need to present the details of the demodulator 46. The output of the demodulator 46 is applied to the telephone receiver 16 through an amplifier 50 and a low pass filter 52. When the frequency of the injection signal applied to the demodulator 46 is equal to that of the modulated carrier signal to be detected, the modulated carrier signal can be applied directly to the demodulator 46. However, as will become apparent shortly, in a dual-frequency telephone channel system it may be desirable to detect a modulated carrier signal on a reception channel using an injection signal whose frequency differs from that of the modulated carrier signal. In such case a station translator 54 is required for shifting the carrier frequency of the modulated carrier signal to the frequency of the injection signal before demodulation can take place.

The channel control signal is applied to the variable frequency generators 42 and 48 to determine the frequency of the carrier and injection signals respectively generated therein and consequently also the assigned transmission and reception channels. Since in a single-frequency telephone channel system the transmission and reception channels constituting a single telephone channel have the same frequency, the associated injection and carrier signals likewise have the same frequency and consequently one frequency generator can replace both frequency generators 42 and 48. A well known frequency generator ideally suited for this purpose is a frequency synthesizer which is responsive to binary coded signals, the type of signals used herein as will be described later, and which is capable of providing a broad range of precise frequencies.

In a dual-frequency telephone channel system it is also possible to use one frequency generator such as a frequency synthesizer which generates a single frequency for both the injection and carrier signals if done in conjunction with a frequency translator such as translator 54. In such case the injection and carrier signals could have a frequency corresponding to the transmission channel over which audio signals are to be transmitted while the station translator 54 shifts the detected carrier frequency by the same fixed amount and in a direction opposite to the shift introduced by the central translator 28. Inclusion of station translator 54 thus eliminates the need for two frequency generators or deriving two different frequencies from one generator. It is obvious that the station translator 54 could just as well be placed in series with the output of modulator 40 in which case the frequency of the carrier and injection signals would be equal to that of the received modulated carrier signal.

To ensure the frequency precision of the transmission and reception channels is determined by the frequencies of the carrier and injection signals respectively, these signals can be derived from a single fixed reference frequency which is applied to all of the variable frequency generators 42 and 48 in all of the stations 10. This reference frequency could be provided by an unmodulated carrier signal generated and applied to the common cable 22 by the control center 24. Rather than dedicate a channel for this purpose it is preferable to utilize the carrier frequency of a modulated carrier signal which is fixed and which is always present on the common cable 22 such as that used for carrying the control signal information. The signal transceiver 26 includes a control signal receiver 56 which detects the control modulated carrier signal intended for its associated station 10 extracting the carrier frequency which is then used as a reference frequency for driving the frequency generators 42 and 48 and passing on the control signal information to its intended destination within the station 10. Whether or not there is a control signal present which is intended for a particular station 10, the carrier signal is always present and therefore receivable by the control signal receiver 56 for providing a continuous reference frequency. The detection is performed by a control signal demodulator 58 which may assume various well known forms for extracting the carrier frequency as well as the modulation information. For example, one simple technique would employ an A.M. detector in combination with a voltage clipper and a carrier signal which has a small degree of amplitude modulation by the control signal information in the control center 24 (e.g. 30 percent) and which is applied to the inputs of both in the demodulator 58. The output of the A.M. detector provides the control signal information with the modulation information is removed by the clipper so that an unmodulated A.C. signal is produced at its output for use as the reference frequency. The control signal information is applied to a control signal interface circuit 60 within the control signal receiver 56 which includes circuitry for recognizing and properly routing to their intended destinations within the associated station 10 control signals intended for that station while ignoring all control signals intended for the other stations.

The signal transceiver 26 also includes a monitor signal transmitter 61 having a monitor signal interface circuit 62 for encoding station condition information received from its associated telephone instrument 12 into a format suitable for transmission over the common cable 22 so that the control center 24 can recognize the information as well as the station from which it originated. The encoded information is then applied to a monitor signal modulator 64 where it modulates a carrier signal whose frequency determines the dedicated channel over which all monitor signals are transmitted to the control center 24 for processing.

Figure 3:
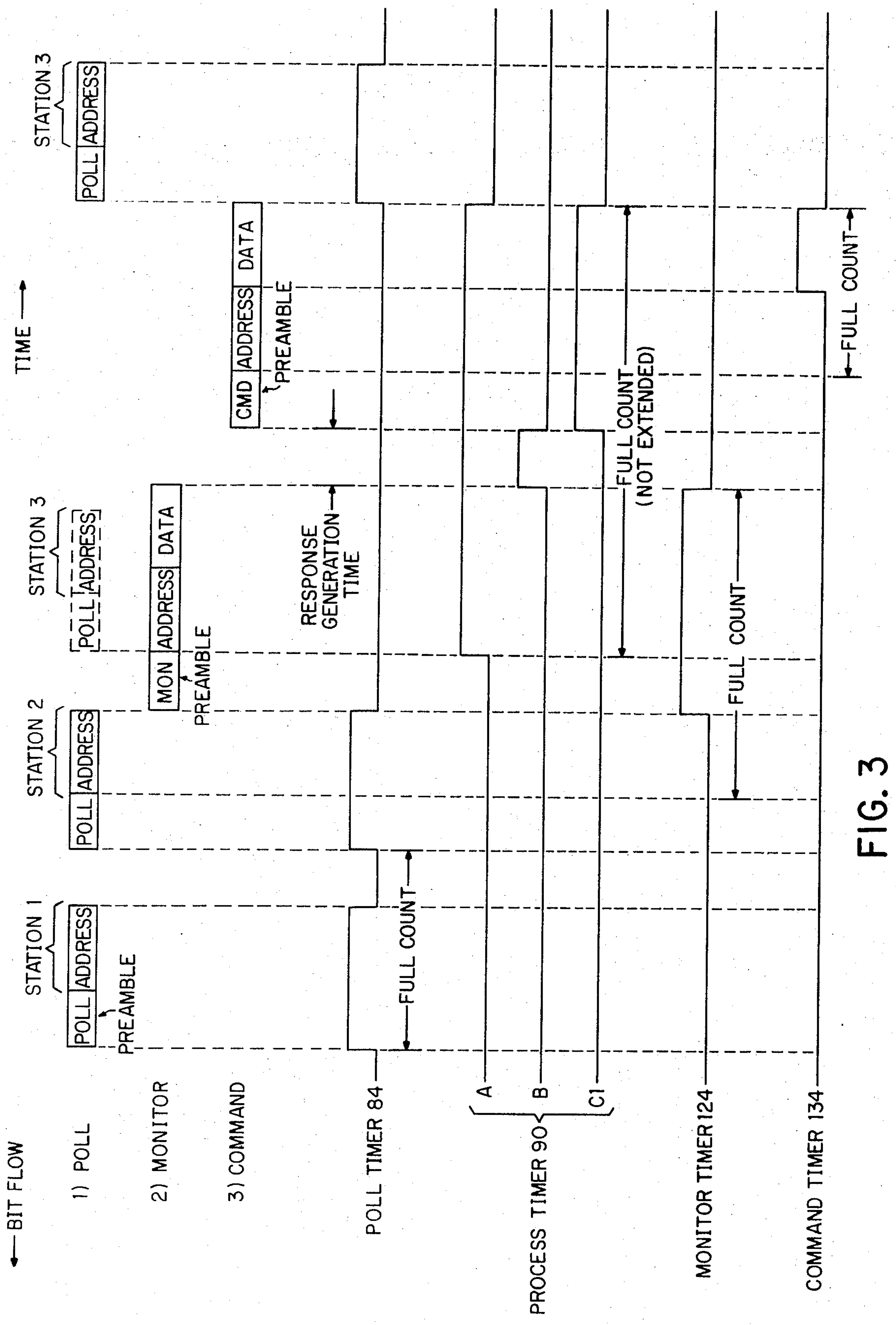
FIG. 3 presents the format for the monitor and control signals used in the preferred embodiment for information exchange between the control center and individual telephone stations together with the timing waveforms used to generate those signals.

In the preferred embodiment the monitor and control signals are in the form of binary words, each having a fixed number of as many bits as is required by the system design. The control center 24 generates two types of control words, namely poll and command, while the signal transceiver 26 generates only one type of monitor word whenever there is a change in station condition (caused by some subscriber action such as lifting or returning the telephone handset to its cradle) which requires processing by the control center 24, the type of processing required being referred to hereinafter as a process request. A typical interchange of monitor and control words is shown in FIG. 3 wherein line 1 (poll control word) and line 3 (command control word) are generated by the control center 24 and line 2 (monitor control word) is generated by the signal transceiver 26.

It will be noted that each word begins with a preamble which is used for word synchronization purposes and is coded to permit the receiving equipment to identify the type of word being received (bit synchronization can be provided in a number of different ways, for example, through a separate channel dedicated thereto or by the use of various coding techniques wherein each bit requires a level transition such as the well known Manchester coding). The preamble is followed by an address field wherein the binary equivalent of each station identity is entered for routing control signals to their intended station destinations and for identifying the telephone stations 10 from which monitor signals originated. The address field is followed by a data field (in the case of the monitor and command control words) wherein the actual control or monitor data is entered for permitting the control center 24 and individual telephone stations 10 to exchange required information.

Each subscriber action giving rise to a change in station condition and thus a process request and each type of command control signal responsive thereto is identified by a bit or bits in the data field whose location in the field is predetermined and remains fixed, thereby indicating the type of information provided and whose magnitude provides the information itself. For example, the first bit in the monitor word data field might correspond to the idle/busy condition of a station with a logic "0" indicating on-hook and a logic "1" indicating off-hook. Similarly the first bit in the command control word data field might be used to control ringing with a 1 being used as a ringing control signal to effectuate ringing in the station receiving the control word and a 0 to inhibit ringing. The identity of a called station is provided by entering its binary equivalent in the proper location of the monitor word data field generated by the calling station. Telephone channel assignment is accomplished by entering the binary equivalent of the assigned telephone channel in the proper location of the command control word data field generated by the control center for transmission to the intended stations.

The control center 24 sequentially polls the stations 10 for process requests by applying thereto individual poll control words. So long as there is no process request from any station, polling is continuously performed beginning with station 1 and continuing to the last station, after which the polling is recycled. When a polled station has a process request, such as station 2 in FIG. 3, it responds to the poll immediately by generating a monitor word which is used to identify the type of processing required.

Receipt of a monitor word in the control center 24 does two things; first, it inhibits the control center 24 from continuing the polling until there is a proper response to the monitor word (viz. proper command control word generated and transmitted) and, two, it initiates the response. After an adequate time period for generating the command control word response, the control center 24 sends the generated word to the polled station (2 in our example) thereby satisfying the process request. After the command control word is transmitted, the control center then resumes its polling. As illustrated in FIG. 3, the monitor word from station 2 delayed the poll of station 3 from the period of time when it would have occurred had there not been a process request (dashed poll word for station 3) until the later period (solid poll word for station 3) following transmission of the monitor word by station 2 and the generation and transmission of the command control word in response thereto by the control center 24. For simplicity of explanation it has been assumed that there is no transmission lag between the source and destination of the signals. In large systems where the control center 24 and the stations 10 may be located physically far apart, it is realized that there will be some transmission lag which can easily be accounted for in the timing sequences utilized.

Figure 4:
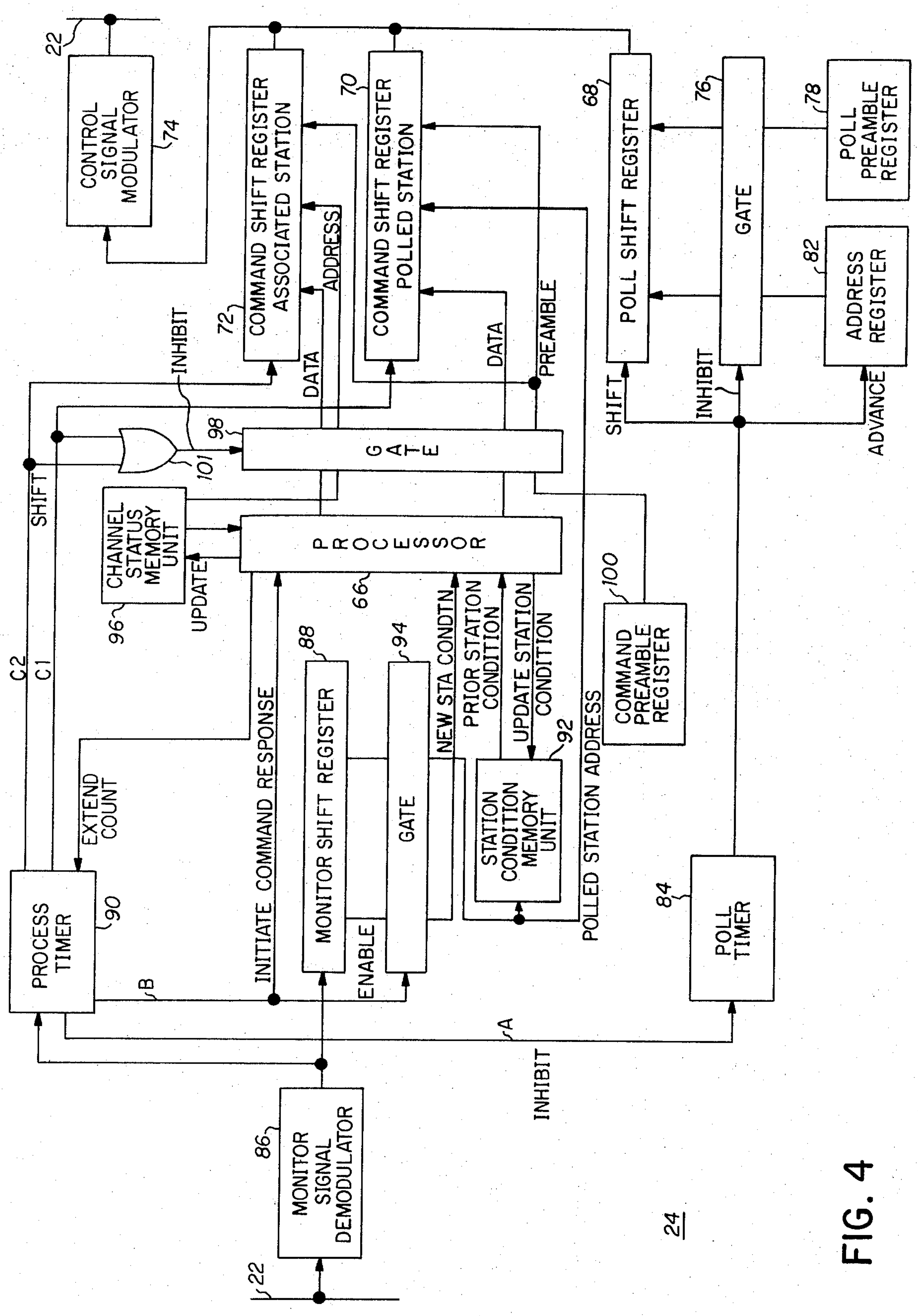
FIG. 4 is a detailed block diagram of the control center which provides the automatic switching functions.

As shown in FIG. 4, the control center 24 includes all the necessary equipment for identifying the sources and data content of all monitor words received therein as well as for generating and transmitting properly addressed poll and command control words. Monitor words are processed in a processor 66 which is designed to respond with a different command control word for each different type of process request received, to be described later in connection with the flow chart presented in FIG. 5. As mentioned earlier the processor 66 may take the form of hard-wired logic circuitry or more desirably a stored computer program used in conjunction with a general purpose computer.

The control center 24 includes three shift registers 68, 70 and 72 for generating the control words, which are then applied to a control signal modulator 74 for transmission through the common cable 22 over the channel dedicated thereto. The control word bits are entered into the shift registers in parallel and shifted out serially in response to a shift signal. The poll control words are generated in poll shift register 68 whose input leads are connected through a gate 76 to the output leads of two registers used to form the poll control words. A poll preamble register 78 generates a fixed binary output corresponding to the poll preamble code used, while an address register 82 generates a binary output corresponding to the identity of the station 10 which is to be polled. Each time a shift signal is applied to poll shift register 68 to shift the poll control word out, this same signal is applied to the address register 82 to advance it to the binary output corresponding to the next station to be polled and to gate 76 to inhibit it from passing information at this time. This signal is generated by a poll timer 84 which provides a fixed count corresponding to the total number of bits in a poll control word together with the fixed number of bits separating successive poll control words. As shown by the output signal waveform for poll timer 84 in FIG. 3, the actuating signal for shifting, inhibiting and advancing (as represented by the upper level of the waveform) is generated at the beginning of the count and lasts until the count reaches the number of bits in a poll control word at which time the signal is removed until a full count is reached whereupon the count is recycled (if not inhibited from recycling to be explained shortly).

The monitor modulated carrier signals are received one at a time in the control center 24 by a monitor signal demodulator 86 which extracts each monitor word and serially applies its bits to a monitor shift register 88. The monitor word is also applied to a process timer 90 which upon recognizing the monitor word preamble begins counting in order to provide various signals required during the processing operation. A full count is obtained between the onset of the monitor word address field and the transmission of the last bit of the responsive command control word after which the count is recycled upon receipt of a subsequent monitor word. At the very beginning of the count the process timer 90 generates an inhibit signal which is applied via lead A to the poll timer 84 to interrupt the polling sequence until the responsive command control word is transmitted. The waveform for this signal as well as for that of the other timer signals is shown in FIG. 3.

Station condition information for each station 10 is stored in a station condition memory unit 92, there being a separate storage location in the unit 92 for each station 10. Whenever a monitor word is received, indicating a change in station condition created by some subscriber action, the processor 66 compares this with the prior station condition found in the memory unit 92 in order to determine the type of processing required. The polled station address is applied to the memory unit 92 to select the prior station condition for the polled station for application to the processor 66. The prior station condition information lets the processor 66 know what process steps have already been performed so that they are not repeated (for instance if the prior station condition off-hook information is a 1, then a 1 in the off-hook condition location of a newly received monitor word will not give rise to a process request for dial tone as it did when first received) and by comparison with the newly received information deduced from the monitor word, it permits the processor 66 to single out the required process step which is responsive to the subscriber action giving rise to that monitor word. Once a monitor word is entered in monitor shift register 88, the process timer 90 applies an enable signal via lead B to a gate 94 which permits the information in the data field to be applied to the processor 66 and the address field information to be applied to the station condition memory unit 92, thereby enabling the memory unit 92 to access and apply to the processor 66 the prior station information corresponding to that address. At this time the address is also entered into the address field of the command control word to be generated in command shift register 70 for transmission back to the polled station. The signal on lead B is also applied to the processor 66 to initiate the command control word response. When the processing is completed the processor 66 updates the information in the station condition memory unit 92 by entering in the location of the polled station its new station condition and if applicable a new station condition in the storage location for the associated station which is calling or being called by the polled station (e.g. if the polled station is a calling station and ringing has just been applied to the called station, this new station condition for the called station is entered into the storage location corresponding thereto).

A telephone channel status memory unit 96 is provided in the control center 24 for monitoring the utilization of telephone channels, each channel having a separate storage location in the unit 96 wherein the address of all stations using the channel at any time are retained. The identity of each telephone channel being utilized is stored in the station condition memory unit 92 in the location corresponding to the station using the channel so that by cross checking both memory units 92 and 96 the processor 66 is always able to relate calling and called stations. As with the station condition memory unit 92, the channel status memory unit 96 is constantly updated so that the processor 66 knows at all times which telephone channels are available for establishing communication paths between stations, the available channel being selected in any predetermined manner.

Some monitor words require a response of two command control words, one being directed to the polled station generating the monitor word and the other being directed to the associated station involved in the call (e.g. once the called station digits are all dialed and received in the processor 66 and the called station is found to be idle, ring-back tone is sent to the calling station and ringing is applied to the called station). Command shift register 70 generates and transmits the command control word to the polled station, while command shift register 72 generates and transmits the command control word to the station associated with the polled station when two command control words are required in response to a single monitor word. Whenever a monitor word requiring a response by two command control words is received, the processor 66 applies a signal to the process timer 90 to extend its count by the number of bits in a command control word to provide sufficient time for serially transmitting the second command control word to the associated station after the first command control word has been transmitted to the polled station (this also inhibits resumption of the polling sequence during the extended count).

The processor 66 enters the command control information into the data field locations of command shift registers 70 and 72 through a gate 98, while the channel status memory unit 96 enters the address of the associated station into the address field location of register 72 through that gate. The command control word preamble is applied to registers 70 and 72 through gate 98 from a command preamble register 100 which generates a fixed binary output corresponding to the command preamble code. A shift signal on lead C1 (shown in FIG. 3) for one command control word or successive shift signals on leads C1 and C2 (not shown in FIG. 3) when required for two command control words are generated by the process timer 90 and applied to registers 70 and 72 to shift the monitor word or words out therefrom. These shift signals are applied to gate 98 through an OR gate 101 to inhibit this gate whenever information is being shifted out of either register 70 or 72.

Figure 5:
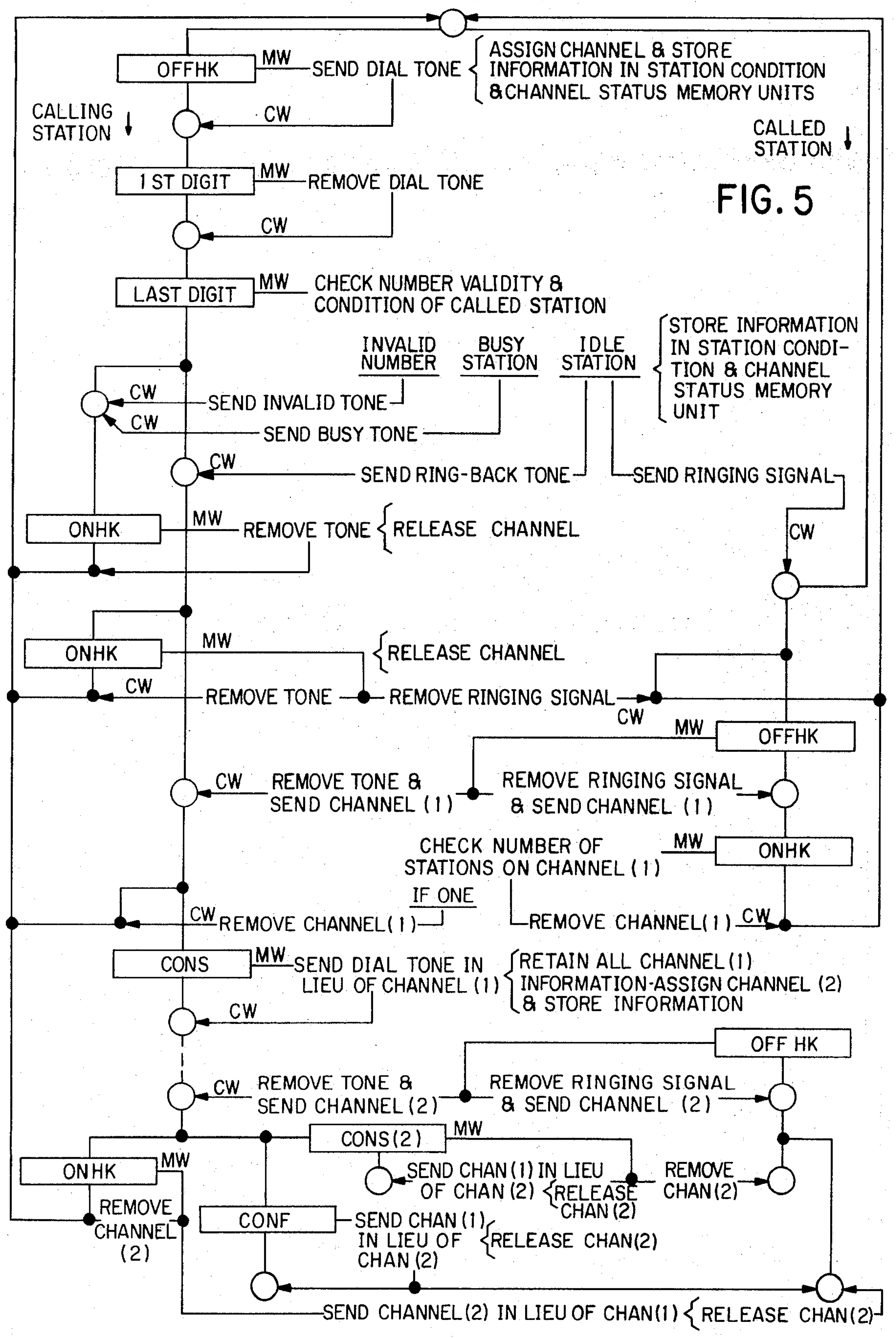
FIG. 5 is a flow chart which relates the different control signals generated by the control center to the different monitor signals received therein.

The flow chart of FIG. 5 shows all of the subscriber actions (rectangular boxes) which give rise to monitor words (MW) for processing, the required command control words (CW) responsive thereto by the processor 66 and the various station conditions which are stored in the station condition memory unit 92 (circles). It is to be understood that this chart is merely one representation of a basic telephone system processor which could easily be expanded to provide any features which are desired.

There are seven different subscriber actions as follows:

| | | |
|---|---|---|
| 1. | OFFHK | Hook switch disengaged |
| 2. | 1ST DIGIT | First digit of called station dialed |
| 3. | LAST DIGIT | All required digits of called station dialed |
| 4. | ONHK | Hook switch engaged |
| 5. | CONS | Access a second telephone channel for a consultation call |
| 6. | CONS (2) | Retrieve original telephone channel and drop consulted party |
| 7. | CONF | Retrieve original telephone channel and retain consulted party for a conference call |

As already mentioned each new station condition brought about by a subscriber action or the processor 66 itself (e.g. ringing at a called station) is stored in its appropriate location within the station condition memory unit 92, so that when a monitor word for a subscriber action is received by the processor 66 it can compare it with the processing already done so as to determine the process request requiring attention. When a calling subscriber initially goes off-hook in order to originate a call, the resultant monitor word indicating off-hook is compared with the prior station condition data indicating on-hook which causes the processor 66 to return dial tone to the calling station by setting its frequency generator 48 (via a command control word) to the dial tone channel thereby informing the subscriber that he may begin dialing the telephone number of the called station. At this time the processor 66 assigns the next available telephone channel (available channels being assigned in any predetermined manner) to this call and in so doing stores the identity of the telephone channel in the calling station location in the station condition memory unit 92 as well as the calling station identity in the assigned telephone channel location in the channel status memory unit 96. If desired the channel assignment can be postponed until the called station is found idle and actually rung.

When the first digit monitor word is received, the processor 66 removes dial tone in order to let the subscriber know that the call is being properly processed.

Receipt of the last digit monitor word together with the identity of the called station initiates a number of operations by the processor 66. First the validity of the called station number is checked; if found to be invalid (by comparison with a table of valid numbers) an invalid tone is sent to the calling station by setting its frequency generator 48 to the invalid tone channel. If the called station number is valid, the processor 66 makes an idle/busy check by checking the off-hook condition of the called station in the station condition memory unit 92. If the called station is found to be busy, then busy tone is returned to the calling station by setting its frequency generator 48 to the busy tone channel. If the called station is found to be idle then the processor 66 sends ring-back tone to the calling station and sets the ringing signal bit to 1 in the command control word intended for the called station so that ringing is applied thereto. At this time the identity of the called station is stored in the channel status memory unit 96 in the appropriate telephone channel location which has been assigned thereto and the identity of this telephone channel is stored in the called station location of the station condition memory unit 92.

Should the calling subscriber abandon the call before the called party has had an opportunity to answer it, the processor 66 sets the ringing signal bit back to 0 thereby terminating ringing and also removes ring-back tone. Both calling and called stations are returned to their on-hook station conditions. If the call is answered, the off-hook monitor word generated by the called station, when compared with the prior station ringing condition, causes the processor 66 to change the ringing signal bit back to 0 in the called station command control word, remove ring-back tone via the calling station command control word and set the frequency generators 42 and 48 of the calling and called stations to the assigned telephone channel thereby permitting the telephone subscribers to converse with one another. Any time a subscriber goes on-hook his station condition is returned to its original state (top of FIG. 5).

Should a telephone subscriber who is already engaged in a telephone conversation wish to consult privately with another party without abandoning the telephone call he may do so by generating a consult signal in a monitor word, for example, through the use of a brief hook flash or in the case of a multi-frequency tone telephone subset by depressing a button specially dedicated for that purpose which could set an assigned monitor word data bit used for that information to 1. Upon receipt of this monitor word the processor 66 sets the frequency generator 48 of the subscriber initiating the consultation to the dial tone channel while retaining in the channel status memory unit 96 and the station condition memory unit 92 all relevant information. At this time the processor 66 assigns a second telephone channel for use by the consulting subscriber and stores the information accordingly. All the steps previously alluded to are now followed in establishing an audio communication path between the parties to the consultation call using the second telephone channel.

After speaking with the consulted party privately the subscriber originating the consultation has three options; namely 1) return to the original call and drop the consulted party, 2) return to the original call without dropping the consulted party, thereby establishing a conference call or 3) do not return to the original call, but permit the consulted party to do so. The originating subscriber may adopt the third option merely by replacing the telephone handset on its cradle whereby comparison of the on-hook monitor word generated in response thereto with the second telephone channel condition information in the memory unit 92 by the processor 66 causes it to remove the second telephone channel from the frequency generators 42 and 48 of both consulting parties and to set the frequency generator 42 and 48 of the consulted party to the first telephone channel. It may be readily seen that each of the first two options may be implemented by the originating subscriber through the generation of an appropriate signal in a monitor word, for instance a consult 2 signal for dropping the consulted party (option 1) by hookflashing or depressing the dedicated pushbutton a second time (a counter could be easily provided to detect this second operation in the telephone instrument itself to change the consult bit back to 0 and a conference signal for establishing a conference call (option 2) by using a different dedicated button or hookflash scheme to set a different monitor word bit to 1.

To avoid needlessly tying up telephone channels, the processor 66 may be set to release a telephone channel whenever there is only one subscriber connected thereto. To accomplish this the number of telephone stations connected to each telephone channel at any time is retained in the appropriate channel location in the channel status memory unit 96. Each time a new station is added to a channel the number of stations connected to that channel is increased by one while the number is reduced by one each time a station is removed from the channel. When this number reaches one for any telephone channel (after a call has been established of course) the channel is automatically released.

Figure 6:
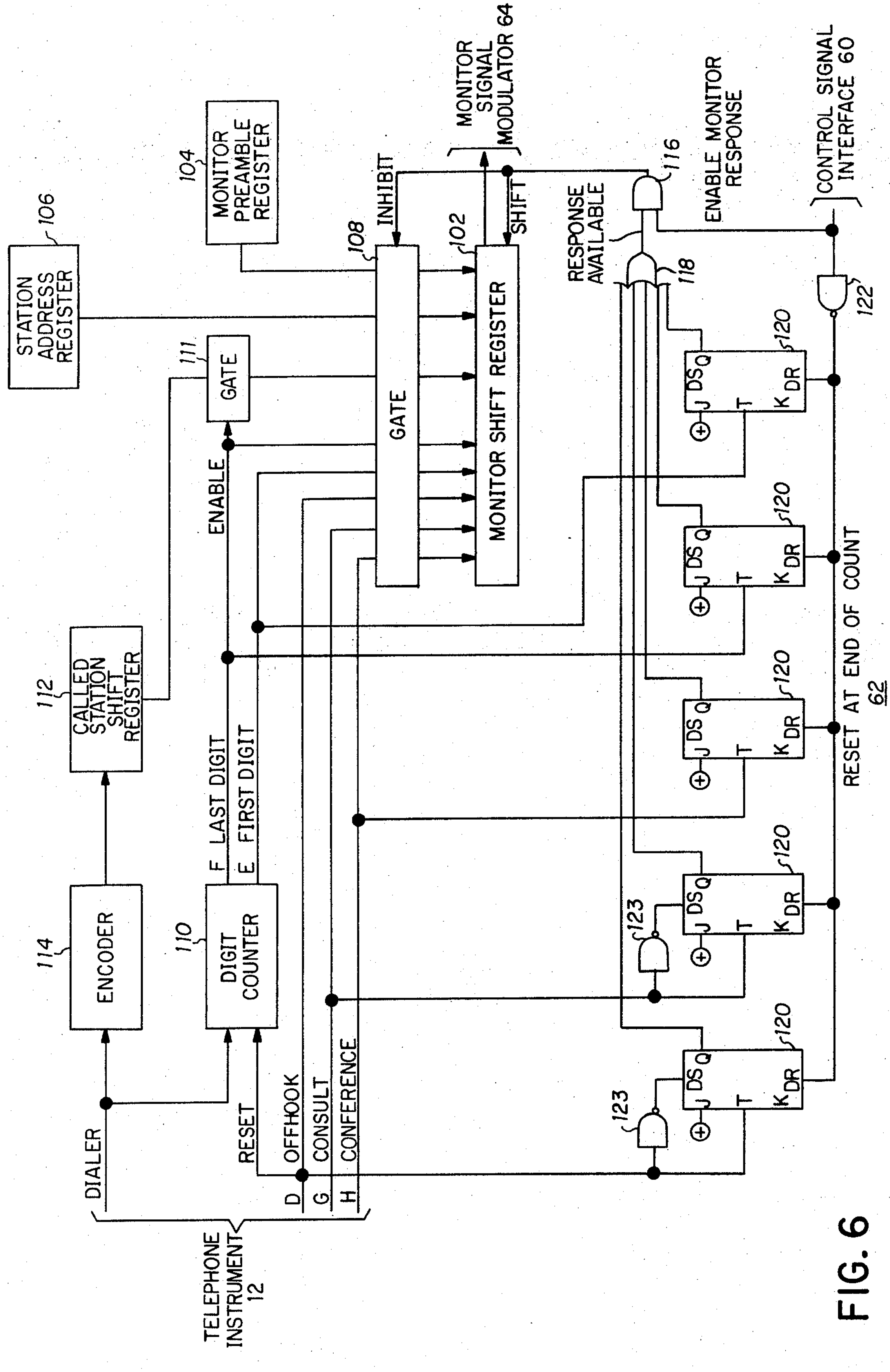
FIG. 6 is a detailed block diagram of the monitor signal interface which comprises each telephone station monitor signal transmitter.

As shown in FIG. 6, the monitor signal interface 62 of each monitor signal transmitter 61 includes a monitor shift register 102 wherein each monitor word is generated before being transmitted over the cable 22 via the associated monitor signal modulator 64. The preamble is generated by a monitor preamble register 104 while the station address identifying the station is generated by a station address register 106, the fixed binary outputs of which are applied to the shift register 102 through a gate 108. The station address register 106, which is also used to identify a control word intended for its associated station 10 could for convenience be located on the outside of the telephone instrument 12 itself so that the telephone number of any station could easily be changed merely by replacing its address register 106 with a new one corresponding to the new number. This is important when a subscriber who wishes to retain his old telephone number moves from one location to another.

Each subscriber action resulting in a monitor word for processing has a different input or group of inputs to the shift register 102 via the gate 108. For example, the off-hook information is entered into the shift register 102 into its proper bit location via lead D so that whenever the associated telephone is off-hook, the level of the bit in this location is 1 (a 1 being generated by disengagement of the hookswitch). The monitor signal interface 62 includes a digit counter 110 which generates a 1 on lead E as soon as the first digit of a called number is dialed by a telephone subscriber and which generates a 1 on lead F as soon as the last digit of the called number is dialed (which is readily determinable since each station telephone number has a fixed number of digits). The signal on lead E is entered into one of the bit locations of the monitor word so that the processor 66 knows when dial tone is to be removed, while the signal on lead F lets the processor 66 know when all the called station digits have been dialed for processing purposes and which is also applied to a gate 111 which controls the flow of called station information from a shift register 112. The binary digit values of a called number are serially entered into shift register 112 via an encoder 114 which converts rotary dial pulses or multi-frequency tones for each digit, which ever the case may be, to a binary format. After the last digit of the called station is dialed, the entire binary coded number which is located in shift register 112 is entered into the data field of the monitor word formed by shift register 102 whereupon it is then transmitted to the control center 24 in response to a shift signal which is also applied to gate 108 to inhibit it at this time. The digit counter 110 is reset to zero via lead D whenever the telephone instrument 12 is returned to its on-hook condition by engaging the hook switch (replacing the handset on its cradle).

A shift signal for shifting a monitor word out of the register 102 is generated only when an AND gate 116 having two inputs is fully enabled. AND gate 116 is partially enabled by an enable monitor response signal from the control signal interface 60 via the lower lead for the period of time equivalent to the number of bits in a monitor word after its associated station 10 is polled (generation of this signal will be explained below). The upper input lead of AND gate 116 is connected to the output of an OR gate 118 which has a plurality of inputs, each being connected to the Q output of a different J-K flip-flop 120. Whenever any one of the flip-flops 120 is set (Q output high) OR gate 118 generates a response available signal to partially enable AND gate 116. AND gate 116 is fully enabled to generate a shift signal by the coincidence of the response available and enable monitor response signals. The toggle lead T of each flip-flop 120 is connected to a different one of the subscriber action leads D-H for initiating a monitor word whenever there has been one of the seven subscriber actions defined in FIG. 5 (leads D & G providing two actions each). Any time one of these leads changes from a 0 to a 1 (or either lead D or G changes from a 1 to a 0) indicating a process request, its associated flip-flop 120 is set to permit a monitor word to be generated in response thereto. When the associated telephone station 10 is subsequently polled, AND gate 116 generates a shift signal for shifting the information out of the shift register 102. Each of the flip-flops 120 is reset via the direct reset DR lead through an inverter 122 whenever the enable monitor response signal terminates at the end of the monitor word transmission. The direct set (DS) leads of the flip-flops 120 corresponding to the off-hook and consult information are connected to leads D & G respectively, via inverters 123 so that any time the associated telephone instrument is returned to its on-hook condition or a consult 2 subscriber action (as previously described) occurs, the change in the corresponding bit level from a 1 to a 0 directly sets the associated flip-flop 120 to generate a monitor word.

Figure 7:
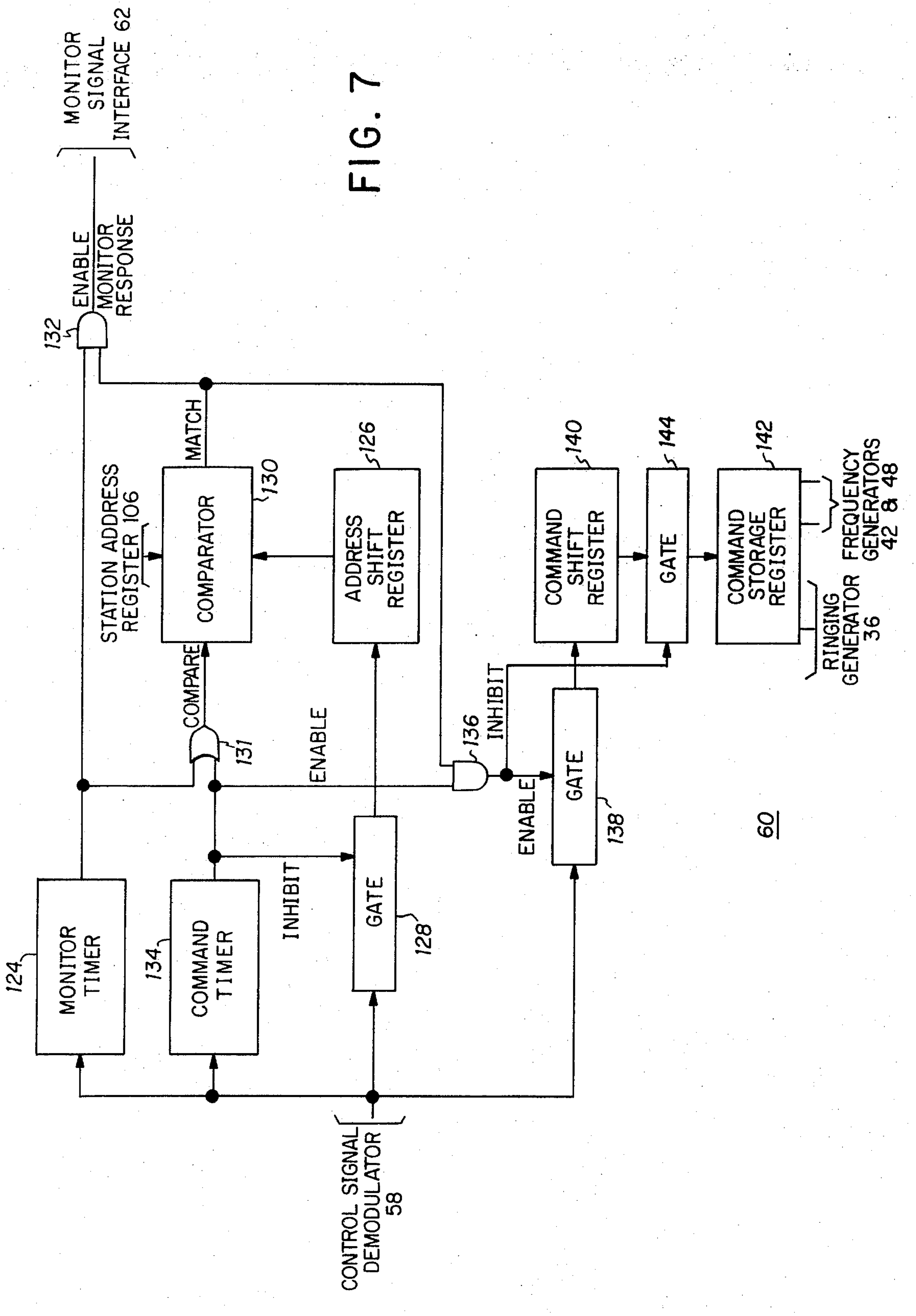
FIG. 7 is a detailed block diagram of the control signal interface which comprises each telephone station control signal receiver.

As shown in FIG. 7, the control signal interface 60 of each control signal receiver 56 includes a monitor timer 124 which begins its count whenever it recognizes the preamble of a poll control word which is applied thereto by its associated control signal demodulator 58. A full count corresponds to the number of bits in an address field together with the number of bits in a monitor word. An address shift register 126 is provided for serially receiving the information bits in the address field of each control word via a gate 128 after which the received address is compared with the output of the station address register 106 in a comparator 130 to determine if the control word is intended for the associated station. When the monitor timer 124 reaches a count equivalent to the number of bits in an address field it generates an output signal (see FIG. 3) for the rest of the count which is applied to the comparator 130 via an OR gate 131 to permit a comparison of the address in register 126 with the associated station address. If the two agree, the comparator 130 generates a match signal which together with the monitor timer 124 output signal is applied to an AND gate 132 to generate the previously discussed enable monitor response signal which is applied to the monitor signal interface 62 to permit a monitor response to the poll if a response is available.

Each time a command control word is received in the control signal interface 60 via the control signal demodulator 58, upon recognition of its preamble, a command timer 134 begins counting for a count equivalent to the remaining number of bits in the word. When the count corresponds to the number of bits in the address field, the command timer 134 generates an output signal (see FIG. 3) which is applied to the comparator 130 via OR gate 131 to enable a comparison of the received command control word address with the station address. If the two agree the resulting match signal generated by comparator 130 together with the output enable signal from command timer 134 fully enables an AND gate 136 to apply an enable signal to a gate 138 to permit the information in the data field of the command control word to pass therethrough. The data field information is inhibited from passing through gate 128 at this time by the output signal from command timer 134.

The command control word data bits are applied serially via gate 138 to a command shift register 140, the outputs of which are connected in parallel fashion to the inputs of a command storage register 142 via a gate 144 which is inhibited from passing information whenever gate 138 is enabled to pass information to shift register 140. Once all the data field information in a received command control word is entered in shift register 140, the command timer 134 output enable signal is removed thereby removing the inhibit signal to permit gate 144 to pass the newly received command data to the command storage register 142. The outputs of the command storage register 142 are connected to the various pieces of equipment in the telephone station 10 which are controlled from the control center 24. For example, one lead is connected to the ringing generator 36, while as many leads as are required are connected to the frequency generators 42 and 48 for controlling telephone channel assignment. The control information output of register 142 does not change until some new command control word data is received in register 140 and applied thereto.

Thus the frequency division multiplex telephone system disclosed herein is seen to perform all the functions of any typical space-divided telephone system having automatic switching, including any desired special features, conferencing being an example thereof, and to perform those functions in a manner which affords significant savings over the distribution costs of same. Furthermore, the disclosed system provides great flexibility, albeit with a minimal initial capitalization, for serving new telephone stations whenever required without the need for either adding more distribution capacity to a fully utilized distribution plant or alternatively providing unutilized distribution capacity initially to meet future growth (representing wasting capital) as is required with a space-divided system. The size of the system depends essentially upon the number of telephone channels which can be accommodated by the bandwidth of the cable used, together with the degree of acceptable blocking (the speed of available signal communication systems for serving the telephone stations is usually no problem), design factors which can economically support even the largest of most encountered telephone systems.

In any system such as the foregoing many changes can be made which are not relevant to the novel features taught by the invention. Bearing this in mind, the specific embodiment disclosed herein is intended to be merely exemplary of the invention and not restrictive thereof since various modifications readily apparent to those familiar with the art can obviously be made without departing from the spirit and scope of the invention as claimed hereinbelow.

What is claimed is:

1. A frequency division multiplex telephone system for serving a plurality of telephone stations by a common cable using a plurality of telephone channels wherein each channel provides an individual communication path over the cable through a carrier signal having a unique frequency which is modulated by a signal to be transmitted, comprising:

a plurality of station transmitters, one for each station interconnecting its telephone transmitter with the cable for providing a telephone channel over which to transmit audio signals generated therein and wherein the channel so provided is determined by a channel control signal applied thereto, there being a different channel control signal for each telephone channel;

a plurality of station receivers, one for each station interconnecting its telephone receiver with the cable for providing a telephone channel over which to receive modulated carrier signals wherein the channel so provided is determined by the channel control signal applied thereto;

a plurality of signal transceivers, one for each station for generating monitor signals indicative of various conditions at its associated station and for receiving and applying the channel control signals; and a control center for monitoring and allocating the utilization of telephone channels and for generating and selectively applying to said transceivers the channel control signals in response to monitor signals received therefrom, whereby an audio communication path is established between a calling and called station via a telephone channel assigned thereto by said control center in a predetermined manner by application of the associated channel control signal to their respective transceivers.

2. The telephone system of claim 1 wherein telephone channels are assigned on a telephone call basis, the next available telephone channel being assigned to the next processed call for the duration of the call.

3. The telephone system of claim 1 wherein the channel control and monitor signals are transmitted and received over the common cable on a time division multiplex basis.

4. The telephone system of claim 3 wherein the channel control and monitor signals are transmitted over separate channels dedicated thereto and said control center and transceivers include modulating/demodulating equipment for passing the signals.

5. The telephone system of claim 4 wherein any one of the telephone channels may be used for establishing an audio communication path between any pair of telephone stations and a calling and called station are assigned the next available channel in a predetermined sequence by said control center.

6. The telephone system of claim 4 wherein supervisory tones are continuously applied to the cable, each on a different telephone channel dedicated thereto so that a calling station is enabled to receive a supervisory tone by the application of the associated channel control signal to its station receiver via its signal transceiver.

7. The telephone system of claim 6 including a ringing generator located at each telephone station for applying a ringing signal to an associated ringer in response to a ringing control signal from said control center.

8. The telephone system of claim 4 wherein the carrier frequency used for transmitting control signals is also used as a reference frequency in said station transmitters and receivers for providing precise frequency telephone channels.

9. The telephone system of claim 1 wherein each of said station transmitters employs single sideband modulation.

10. The telephone system of claim 9 wherein said control center is responsive to a consultation call signal from a telephone station already connected to a first telephone station via a first telephone channel for providing a second telephone channel to interconnect said first mentioned telephone station with a second telephone station while maintaining said first telephone station connected to the first telephone channel.

11. The telephone system of claim 10 wherein said control center is responsive to a conference signal from the originating station in a consultation call for disconnecting the two consulting stations from said second telephone channel and connecting them to said first telephone channel.

12. The telephone system of claim 10 wherein said control center is responsive to a second consulation call signal from the originating station in a consultation call for disconnecting the two consulting stations from said second telephone channel and reconnecting the originating station to said first telephone channel.

13. A frequency division multiplex telephone system for serving a plurality of telephone stations by a common cable using a plurality of transmission channels wherein each channel provides an individual signal path via a carrier signal having a unique frequency which is modulated by a signal to be transmitted and an equal plurality of reception channels, each being associated with a transmission channel which is obtained by passing each transmitted modulated carrier signal through a central translator which shifts the carrier frequency by a fixed amount comprising;

a plurality of station transmitters, one for each station interconnecting its telephone transmitter with the cable for providing a transmission channel over which to transmit audio signals generated therein and wherein the transmission channel is selected by a channel control signal applied thereto, there being a different channel control signal for each transmission channel and its associated reception channel;

a plurality of station receivers, one for each station interconnecting its telephone receiver with the cable for providing a reception channel over which to receive modulated carrier signals wherein the channel is selected by the channel control signal applied thereto;

a plurality of signal transceivers, one for each station for generating monitor signals indicative of various conditions of its associated station and for receiving and applying the channel control signals; and a control center responsive to the monitor signals received from said transceivers for allocating and monitoring the utilization of telephone channels and for generating and selectively applying to said transceivers the channel control signals, whereby a telephone channel comprising a pair of associated transmission and reception channels is established between stations by application of the same channel control signal to their associated transceivers.

14. The telephone system of claim 13 wherein each station transmitter and receiver associated with a station includes means responsive to the channel control signal applied thereto for generating carrier and injection signals for mixing to determine the station transmission and reception channels allocated thereto respectively.

15. The telephone system of claim 13 wherein each station transmitter and receiver associated with a station includes means responsive to the channel control signal applied thereto for generating carrier and injection signals for mixing to determine the station transmission and reception channels respectively, the frequency of the signals so generated being equal to that of the transmission channel frequency selected and wherein each station receiver includes a translator for shifting the carrier frequency of received signals by the same amount and in an opposite direction as that provided by the central translator before demodulating the signals.

16. The telephone system of claim 13 wherein each station transmitter and receiver associated with a station includes means responsive to the channel control signal applied thereto for generating carrier and injection signals for mixing to determine the station transmission and reception channels respectively, the frequency of the signals so generated being equal to that of the reception channel frequency selected and wherein each of said station transmitters includes a translator for shifting the carrier frequency of modulated signals by the same amount and in an opposite direction as that provided by the central translator before transmitting the signals.

17. The telephone system of claim 13 wherein the common cable is divided into a transmission and a reception section separated by the central translator and wherein said plurality of station transmitters is connected to the transmission section and said plurality of receivers is connected to the reception section.

18. The telephone system of claim 13 wherein telephone channels are assigned on a telephone call basis, the next available telephone channel being assigned to the next processed call for the duration of the call.

19. The telephone system of claim 13 wherein supervisory tones are continuously applied to the cable, each on a different telephone channel dedicated thereto whereby a calling station is enabled to receive a supervisory tone by the application of the associated channel control signal to its respective station receiver via its transceiver.

20. The telephone system of claim 19 including a ringing generator located at each telephone station for applying a ringing signal to an associated ringer in response to a ringing control signal from said control center.

21. The telephone system of claim 13 wherein each of said station transmitters employs single sideband modulation.

22. The telephone system of claim 13 wherein the control and monitor signals are transmitted and received over the common cable on a time division multiplex basis.

23. The telephone system of claim 22 wherein the control and monitor signals are transmitted by carrier signals, there being one pair of transmission and reception channels dedicated for each and said control center and transceivers include modulating/demodulating transceiver equipment for passing the signals.

24. The telephone system of claim 23 wherein the carrier frequency used for transmitting control signals is also used as a reference frequency in said station transmitters and receivers for providing precise frequency channels.

25. The telephone system of claim 13 wherein said control center is responsive to a consultation call signal from a telephone station already connected to a first telephone station via a first telephone channel for providing a second telephone channel to interconnect said first mentioned telephone station with a second telephone station while maintaining said first telephone station connected to the first telephone channel.

26. The telephone system of claim 25 wherein said control center is responsive to a conference signal from the originating station in a consultation call for disconnecting the two consulting stations from said second telephone channel and connecting them to said first telephone channel.

27. The telephone system of claim 26 wherein said control center is responsive to a second consultation call signal from the originating station in a consultation call for disconnecting the two consulting stations from said second telephone channel and reconnecting the originating station to said first telephone channel.

* * * * *